(No Model.)
A. C. McNEAL.
PLOW.
No. 345,161. Patented July 6, 1886.
Fig. 1.
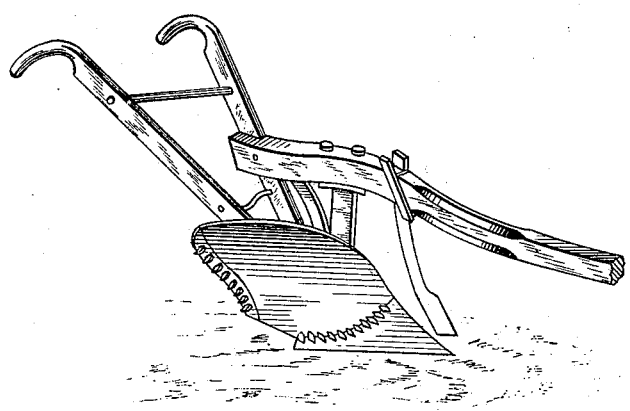
Fig. 2.
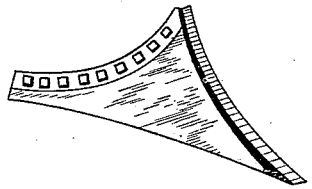
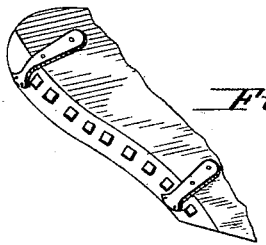
Fig. 3.
Fig. 4.
Fig. 5.
Witnesses:
B. C. Fenwick
Jno. N. Oliver
Inventor:
A. C. McNeal
By H. J. Purvis
atty

UNITED STATES PATENT OFFICE.

ANDREW CREIGHTON McNEAL, OF GEIGERSVILLE, KENTUCKY.

PLOW.

SPECIFICATION forming part of Letters Patent No. 345,161, dated July 6, 1886.

Application filed November 10, 1885. Serial No. 182,371. (No model.)

*To all whom it may concern:*

Be it known that I, ANDREW CREIGHTON MC-NEAL, a citizen of the United States, residing at Geigersville, in the county of Carter and State of Kentucky, have invented certain new and useful Improvements in Combined Plows and Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to plows of the class that is especially designed for turning sod, and cutting and pulverizing the sod while it is being turned; and the invention consists in the novel construction and combination of parts, as will be hereinafter described, and particularly pointed out in the claim.

In the drawings, Figure 1 is a view in perspective of a plow embodying my improvements. Fig. 2 is a view in perspective, from the rear face, of the plow-point detached. Fig. 3 is a sectional detail view, from the rear face, of the mold-board and mold-board line of teeth. Fig. 4 is a view in perspective of one of the plow-point teeth, and Fig. 5 is a view in perspective of one of the mold-board teeth.

Referring by letter to the accompanying drawings, A designates the plow-standard, B the plow-beam, and C C the handles. E is the colter, and F the plow-standard.

The mold-board G is secured to the standard in any of the well-known ways, as by screw-bolts and nuts, and the plow-point is secured to the mold-board by braces or metal cleats and bolts attached to their rear faces. The lower forward edge of the mold-board is in the shape of an arc, which is concave from above downwardly, and along the line of this arc, and a short distance below the said line, is a row of triangular-shaped teeth, H, which have threaded stems and are held in place by nuts H'. To the rear edge of the mold-board is secured a metal casting or strip, I, provided with teeth J, which curve upwardly and outwardly, said casting I being connected with the mold-board by arms K, riveted to the rear faces of said parts. By this construction the teeth cut the sod and act in a measure as pulverizers, the sod being first turned, and severed into sections while being turned. The advantage of this action in plowing sod is obvious, for instead of turning long lengths of sod the strip is separated into several sections, which is a great advantage when the harrow is brought into requisition, as the sod-face of the furrow is turned under and cut during the operation.

Having thus fully described my invention, what I claim as new, and desire to secure by Letters Patent of the United States, is—

The combination, with a mold-board having forwardly-projecting teeth along its rear edge, of a plow-point having a forwardly-projecting row of teeth along its rear curved edge, substantially as specified.

In testimony whereof I affix my signature in presence of two witnesses.

ANDREW CREIGHTON McNEAL.

Witnesses:
W. H. TYREE,
J. M. LOGAN.